PIEZOELECTRIC CERAMICS

Filed May 18, 1970 2 Sheets-Sheet 1

INVENTORS
*Hiromu Omichi*
*Norio Kobayashi*

BY *Kilb, Sherman, Meroni, Gross & Simpson* ATTORNEY

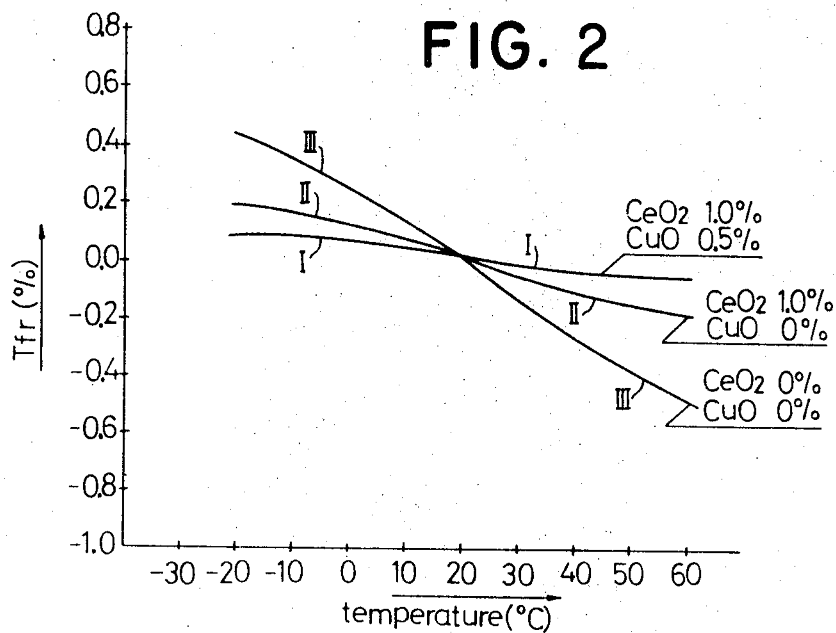
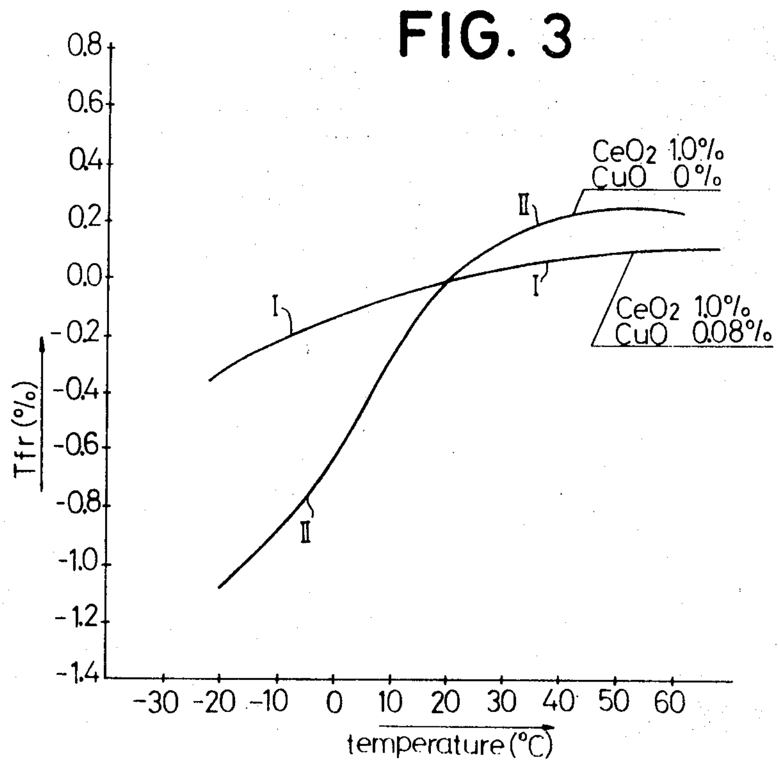
INVENTORS
*Hiromu Omichi*
*Norio Kobayashi*
BY *Hill, Sherman, Meroni, Gross & Simpson* ATTORNEY United States Patent Office 3,654,159

Patented Apr. 4, 1972

1

3,654,159

PIEZOELECTRIC CERAMICS

Hiromu Omichi, Kanagawa-ken, and Norio Kobayashi, Tokyo, Japan, assignors to Mitsumi Electric Company, Ltd., Tokyo, Japan Filed May 18, 1970, Ser. No. 38,316
Claims priority, application Japan, May 21, 1969, 44/38,940
Int. Cl. C04b *35/46, 35/48*
U.S. Cl. 252—62.9 3 Claims

ABSTRACT OF THE DISCLOSURE

A piezoelectric ceramic composed of a basic composition expressed by the general formula $$Pb_mMg_n(Ti_xZr_ySn_z)O_3$$

where the fractions $m$ and $n$ are respectively 0.80 to 0.99 and 0.01 to 0.20 in atom ratio and the fractions $x$, $y$ and $z$ are respectively 0.42 to 0.80, 0 to 0.40 and 0.05 to 0.42 in molar ratio, $CeO_2$ is added to said basic composition in an amount of 0.1 to 1.5 percent by weight relative to the latter, and Cu is added in the form of its single substance, oxide or salt to said basic composition and $CeO_2$ in an amount of 0.04 to 0.80 percent by weight with respect to the total amount of said basic composition and $CeO_2$.

BACKGROUND OF THE INVENTION

Field of the invention

This invention relates to piezoelectric ceramics for electromechanical transducers such, for example, as an electromechanical filter and so on, and more particularly to improved piezoelectric ceramics composed of a basic composition of a system expressed by $$Pb_mMg_n(Ti_xZr_ySn_z)O_3$$

$(m+n=1, x+y+z=1)$, and containing $CeO_2$ as an addition.

Description of the prior art

There have been proposed piezoelectric ceramics composed of a basic composition of the tertiary system lead titanate-lead zirconate-lead stannate, expressed by the formula $Pb(Ti_xZr_ySn_z)O_3$ and containing in oxide form as an addition or additions one or more substances selected from the group consisting of Cr, Mn, Ce, Fe, Al and Bi.

With the use of such tertiary system piezoelectric ceramics which are composed of the basic composition $Pb(Ti_xZr_ySn_z)O_3$ with the mol fractions $x$, $y$ and $z$ being selected in molar ratio of 0.1 to 0.6, 0 to 0.9 and 0 to 0.65 and with addition or additions of one or more members selected from the group including Cr, Mn, Ce, Fe and Al and added in oxide form to the basic composition in an amount of about 0.1 to 1.5 percent by weight with respect to the latter, it is possible to produce an electromechanical filter which has satisfactory radial electromechanical coupling coefficient $K_p$ (percent) where $K_p$ is defined by $$K_p^2=2.51\frac{\Delta f}{f_r}$$

with $f_r$ being a resonant frequency, $\Delta f$ an anti-resonant frequency and $\Delta f=f_a-f_r$. The electro mechanical quality factor $Q_m$ of such filter is defined $$Q_m=\frac{1}{4\pi\Delta f\cdot C_o\cdot R_1}$$

where $C_0$ is the interelectrode electrostatic capacity of the piezoelectric ceramics and $R_1$ is a resonant resistance. The insulation resistance of such filter is IR.

2

However, such an electromechanical filter is still unsatisfactory particularly in terms of the insulation resistance IR. Further, the temperature variation ratio $Tf_r$ of the resonant frequency is large. $Tf_r$ is defined by $$\frac{\Delta f_r}{f_{r\,20^\circ\,C.}}\times 100(\%)$$

where $f_{r\,20^\circ\,C.}$ is a resonant frequency at +20° C. and $\Delta f_r$ is the difference frequency between resonant frequencies at −20° C. and +60° C. Ceramic compositions used for shaping into piezoelectric ceramics are molded into desired shapes and fired or sintered for heat treatment but the firing temperature is relatively high and the firing temperature range required for obtaining desired ranges of $K_p$, $Q_m$ and IR mentioned above is relatively narrow, which imposes various limitations on the production of the piezoelectric ceramics.

SUMMARY OF THE INVENTION

Accordingly, the primary object of this invention is to provide piezoelectric ceramics having a radial electromechanical coupling coefficient $K_p$, an electromechanical quality factor $Q_m$ and an insulation resistance IR which produces superior electromechanical filters.

Another object of this invention is to provide piezoelectric ceramics which have desirable radial electromechanical coupling coefficient $K_p$, electromechanical quality factor $Q_m$ and insulation resistance IR and which can be heat treated at a relatively low temperature but over a wide range of temperatures.

Other objects, features and advantages of this invention will become apparent from the following description taken in conjunction with the accompanying drawings.

BRIEF DESCRIPTION OF THE DRAWINGS

FIGS. 1 to 3, inclusive, are graphic representations of the temperature variation characteristics of resonant frequencies of the piezoelectric ceramics produced according to the present invention and conventional ceramics.

DESCRIPTION OF THE PREFERRED EMBODIMENTS

Figure 1:
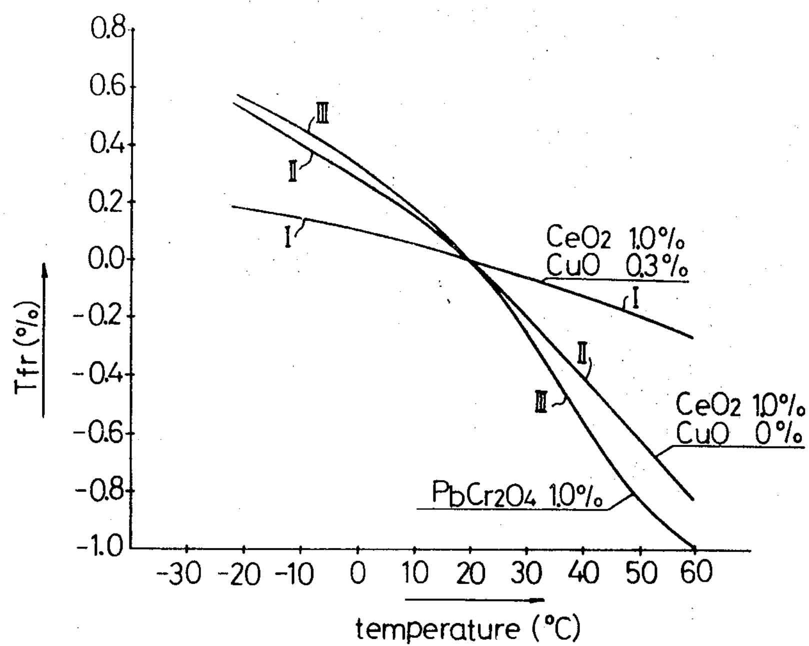

For the purpose of improving the insulation resistance IR, the present inventors have previously proposed piezoelectric ceramics consisting of a solid solution of the tertiary system $Pb_mMg_n(Ti_xZr_ySn_z)O_3$ of a composition modified by the substitution of magnesium Mg for a part of the lead Pb. It has been found that in the case where the fractions $m$ and $n$ are respectively selected to be about 0.8 to 0.99 and 0.01 to 0.2 in atom ratio $(m+n=1)$ and the fractions $x$ and $z$ are respectively selected to be approximately 0.42 to 0.80 and 0.05 to 0.42 in molar ratio, $(x+y+z=1)$ the insulation resistance IR of the piezoelectric ceramics is substantially improved, as compared to case where the aforementioned ceramic consisting of the basic composition of $Pb(Ti_xZr_ySn_z)O_3$ and the oxide or oxides of one or more members selected from the group consisting of Cr, Mn, Ce, Fe, Al, Bi and so on. With the piezoelectric ceramics of the system $$Pb_mMg_n(Ti_xZr_ySn_z)O_3$$

however, the temperature variation ratio of the resonant frequency is relatively large, the firing temperature is relatively high and the range of the firing temperature is relatively narrow as compared to the aforementioned ceramics consisting of the basic composition of $$Pb_mMg_n(Ti_xZr_ySn_z)O_3$$

and the oxide or oxides of one or more members selected from the group consisting of Cr, Mn, Ce and so on.

The present inventors have discovered that the insulation resistance IR is improved with $$Pb_mMg_n(Ti_xZr_ySn_z)O_3$$

and by adding oxides or oxides of one or more members selected from the group Cr, Mn, Ce, Fe, Al, Bi, etc. It was found after various experiments that the temperature variation ratio of the resonant frequency could be reduced by the use of cerium Ce to lower than that obtainable with the other oxide or oxides of one or more members selected from the group consisting of Cr, Mn, Ce, Fe, Al, Bi, etc. However, the temperature variation ratio of the resonant frequency was held very low by the addition of cerium oxide but its value was not satisfactory and the firing temperature of the resulting piezoelectric ceramics was still relatively high and the firing temperature range was narrow.

The present inventors have conducted many experiments on piezoelectric ceramics consisting of the basic composition defined by $Pb_mMg_n(Ti_xZr_ySn_z)O_3$ and $CeO_2$ to obtain improved piezoelectric ceramics which are relatively low in temperature variation ratio $Tf_r$ the resonant frequency $f_r$ and the firing temperature but which has a wide range of firing temperatures and which produces the desired radial electromechanical coupling coefficient $K_p$, electromechanical quality factor $Q_m$ and insulation resistance IR. The present inventors have discovered that improved piezoelectric ceramics characteristics are obtained if copper is added in pure, oxide or salt form to the above basic composition and $CeO_2$.

In accordance with this invention the fractions *m* and *n, x, y* and *z* of the basic composition expressed by $$Pb_mMg_n(Ti_xZr_ySn_z)O_3$$

are respectively selected in the following ranges.

$m=0.8$ to 0.99 (in atom ratio) $m+n=1$
$n=0.01$ to 0.20 (in atom ratio)
$x=0.42$ to 0.80 (in molar ratio) $x+y+z=1$
$y=0$ to 0.40 (in molar ratio)
$z=0.05$ to 0.42 (in molar ratio)

The amount of $CeO_2$ is 0.1 to 1.5% by weight relative to the basic composition.

Further, the amount of CuO is equivalent to 0.04 to 0.80% by weight of Cu relative to the total amount of the basic composition and $CeO_2$.

The values of the fractions *m* and *n, x, y* and *z* and the amounts of $CeO_2$ and CuO are specified relative to one another within such a range that the radial electromechanical coupling coefficient $K_p$, the electromechanical quality factor $Q_m$ and the insulation resistance IR which are desired for the electromechanical filter can be obtained. In particular, the temperature variation ratio $Tf_r$ of the resonant frequency can be very small; the firing temperature T can be reduced; and the firing temperature range for obtaining the desired $K_p$, $Q_m$ and IR can be broader.

In practice, the piezoelectric ceramics of this invention are produced by mixing PbO, $TiO_2$, $ZrO_2$, $SnO_2$, $MgCO_3$, $CeO_2$ and CuO with, for example, a ball mill in a wet mix, drying the mixture, presintering the dried mixture, pulverizing the presintered mixture, adding a bonding agent, for example, polyvinyl alcohol solution to the pulverized mixture, molding the mixture under pressure into a desired shape and firing or sintering the molded form.

The present invention will hereinafter be described with reference to specific examples. Methods will be described for making electromechanical transducers each consisting of a disc-shaped piezoelectric ceramic body about 6.00 mm. in diameter and about 0.4 mm. thick and having electrodes 4.2 mm. in diameter mounted on opposite surfaces of the disc-shaped body.

EXAMPLE 1

A ceramic consisting of a basic composition $Pb_{0.95}Mg_{0.05}(Ti_{0.45}Zr_{0.35}Sn_{0.20})O_3$, and $CeO_2$ added in an amount of 1.0 percent by weight relative to the basic composition and CuO added in an amount of 0.1 percent by weight (equivalent to about 0.08% of Cu by weight) with respect to the total amount of the basic composition and $CeO_2$. The firing temperature T was 1,265° C., the coupling coefficient $K_p$ was 51.0%, the factor $Q_m$ was 580 and the temperature variation ratio of the resonant frequency $Tf_r$ was 0.64%.

A second ceramic of the above basic composition and $CeO_2$ and with CuO added in an amount of 0.3% by weight (equivalent to 0.24% by weight of Cu) relative to the total amount of the basic composition and $CeO_2$, T was 1,250° C., $K_p$ was 51.2%, $Q_m$ was 450 and $Tf_r$ was 0.41%.

A third ceramic consisting of the above basic composition and $CeO_2$ and with CuO added in an amount of 0.5% by weight (equivalent to 0.4% by weight of Cu) with respect to the total amount of the basic composition and $CeO_2$. In this example T was 1,230° C., $K_p$ was 47.0%, $Q_m$ was 670 and $Tf_r$ was 0.38%.

In a fourth ceramic similar to the third ceramic, the CuO was left out and T was 1,310° C., $K_p$ was 51.5%, $Q_m$ was 640 and $Tf_r$ was 1.38%.

In a fifth ceramic similar to the fourth ceramic except $PbCr_2O_4$ was substituted for the $CeO_2$ in amounts of 0.5, 1.0 and 1.5% by weight relative to the basic composition and the following respective characteristics were obtained: T was 1,300° C., 1,295° C., and 1,290° C.; $K_p$ was 51.0%, 54.0%, and 54.0%; $Q_m$ was 327, 360, and 460; and, $Tf_r$ was 1.44%, 1.64% and 1.76%.

It will be seen from this example that the addition of CuO causes a substantial decrease in the firing temperature T and a marked reduction of the temperature variation ratio of the resonant frequency. Although the radial electromechanical coupling coefficient $K_p$ is slightly improved by the addition of $PbCr_2O_4$ instead of $CeO_2$ when CuO is 0%, the temperature variation ratio of the resonant frequency $Tf_r$ becomes substantially higher compared to the example where $CeO_2$ is included. The inclusion of CuO together with $CeO_2$ enables marked reduction of the temperature variation ratio of the resonant frequency $Tf_r$ and of the firing temperature T.

EXAMPLE 2

A system composed of a basic compositon $Pb_{0.95}Mg_{0.05}(Ti_{0.50}Zr_{0.30}Sn_{0.20})O_3$ and $CeO_2$ in an amount of 1.0 weight percent relative to the basic composition and CuO in an amount of 0.5 weight percent with respect to the total amount of the basic composition and $CeO_2$. T was 1,230° C., $K_p$ was 41.0%, $Q_m$ was 1,300 and $Tf_r$ of the resonant frequency was 0.11%.

In the case of making a similar electromechanical transducer by a prior art method using the same materials of similar ratios as in this example except that CuO was 0%, T was 1,295° C., $K_p$ was 44.6%, $Q_m$ was 1,200 and $Tf_r$ was 0.14%.

It appears from this that the addition of CuO reduces the firing temperature T and the temperature variation ratio $Tf_r$ of the resonant frequency.

EXAMPLE 3

A system composed of a basic composition $Pb_{0.95}Mg_{0.05}(Ti_{0.60}Zr_{0.30}Sn_{0.1})O_3$ and $CeO_2$ in an amount of 1.0% by weight relative to the basic composition and CuO in an amount of 0.5% by weight percent with respect to the total amount of the system basis composition and $CeO_2$. T was 1,245° C., $K_p$ was 23.0%, $Q_m$ was 1,600 and $Tf_r$ was 0.17%.

In the case of a ceramic similar to this example except that CuO was 0%, T was 1,320° C., $K_p$ was 26.0%, $Q_m$ was 1,700 and $Tf_r$ was 0.31%.

This shows that the addition of CuO considerably reduces the firing temperature T and the temperature variation ratio of the resonant frequency $Tf_r$.

EXAMPLE 4

A system composed of a basic composition $Pb_{0.95}Mg_{0.05}(Ti_{0.60}Zr_{0.20}Sn_{0.20})O_3$ and $CeO_2$ in an amount of 1.0% by weight relative to the basic composition and CuO added in amounts of 0.1, 0.5 and 1.0% by weight (equivalent to 0.08, 0.4 and 0.8% by weight of Cu) with respect to the total amount of the basic composition and $CeO_2$. T was respectively 1,225° C., 1,210° C. and 1,195° C., IR was 20.0, 15.5 and 11.6 ($\times 10^4$ megohms), $K_p$ was respectively 21.2%, 20.1% and 18.0%, $Q_m$ was respectively 2,300, 2,000 and 1,700 and $Tf_r$ was respectively 0.18%, 0.15% and 0.28%.

A similar ceramic except CuO was not included gave the following: T, 1,285° C.; IR, 19.4 ($\times 10^4$ megohms); $K_p$, 23.3%; $Q_m$, 1,680– and $Tf_r$, 0.32%.

In this case, when $CeO_2$ was not included and instead CuO was included in amounts of 0, 0.1, 0.5 and 1.0 percent by weight relative to the basic composition T was respectively 1,320° C., 1,270° C., 1,250° C. and 1,230° C., IR was respectively 3.0, 15.0, 12.0 and 0.7 ($\times 10^4$ megohms), $K_p$ was respectively 21.0%, 21.0%, 21.0% and 19.0%, $Q_m$ was respectively 1,500, 1,400, 1,420 and 1,350 and $Tf_r$ was respectively 0.95%, 0.45%, 0.40% and 0.43%.

Further, when CuO was not included and $Bi_2O_3$ was included with $CeO_2$ in amounts of 0.1, 0.5 and 1.0% by weight relative to the basic composition T was respectively 1,265° C., 1,245° C. and 1,245° C., IR was respectively 35.0, 24.0 and 36.0 ($\times 10^4$ megohms), $K_p$ was respectively 22.1%, 22.9% and 21.5%, $Q_m$ was respectively 1,800, 1,900 and 1,900 and $Tf_r$ was respectively 0.40%, 0.44% and 0.51%.

In the above case, when $Fe_2O_3$ was added to the basic composition together with $CeO_2$ in amounts of 0.05, 0.10 and 0.50% by weight with respect to the basic composition: T was respectively 1,265° C., 1,265° C. and 1,245° C.; IR was respectively 32.0, 37.0 and 28.0 ($\times 10^4$ megohms); $K_p$ was respectively 21.7%, 22.3% and 22.1%; $Q_m$ was respectively 2,050, 2,020 and 1,880; and $Tf_r$ was respectively 0.65%, 0.75% and 0.78%.

Moreover, in the above case, when $Al_2O_3$ was added to the basic composition together with $CeO_2$ in amounts of 0.10 and 0.50% by weight with respect to the basic composition: T was respectively 1,265° C. and 1,260° C.; IR was respectively 23.0 and 26.4 ($\times 10^4$ megohms); $K_p$ was respectively 22.4% and 22.6%; $Q_m$ was respectively 2,150 and 2,020; and $Tf_r$ was respectively 0.50% and 0.59%.

It will be apparent from the foregoing that the inclusion of CuO results in a lower firing temperature T and temperature variation ratio of the resonant frequency $Tf_r$ and that the addition of $Bi_2O_3$, $Fe_2O_3$, $Al_2O_3$, $Mn_2O_3$ or the like together with $CeO_2$ in the absence of CuO does not result in much improvement in the temperature variation ratio of the resonant frequency or in the firing temperature. This implies that the temperature variation ratio of the resonant frequency and the firing temperature can be markedly reduced only in the presence of both $CeO_2$ and CuO and even if CuO is present, the same results cannot be obtained by the presence of only CuO and an oxide of Bi, Fe, Al, Mn or the like other than Ce.

EXAMPLE 5

A ceramic consisting of a basic composition $$Pb_{0.95}Mg_{0.05}(Ti_{0.65}Zr_{0.15}Sn_{0.20})O_3$$

and $CeO_2$ added in an amount of 1.0% by weight relative to the basic composition and with CuO in an amount of 0.5 weight percent with respect to the total amount of the basic composition and $CeO_2$; T was 1,250° C., IR was 13.5 ($\times 10^4$ megohms), $K_p$ was 17.0%, $Q_m$ was 1,550 and $Tf_r$ was 0.20%.

When CuO was not included in the above ceramic T was 1,320° C., IR was 14.2 ($\times 10^4$ megohms), $K_p$ was 18.6%, $Q_m$ was 1,670 and $Tf_r$ was 0.35%.

It appears for this that this invention enables appreciable reduction of the firing temperature T and the temperature variation ratio of the resonant frequency.

EXAMPLE 6

A ceramic consisting of a basic composition $$Pb_{0.95}Mg_{0.05}(Ti_{0.70}Zr_{0.10}Sn_{0.20})O_3$$

and $CeO_2$ added in an amount of 1.0% by weight relative to the basic composition and with CuO in an amount of 0.5% by weight with respect to the total amount of the basic composition and $CeO_2$. T was 1,220° C., the IR was 8.5 ($\times 10^4$ megohms), $K_p$ was 15.0%, $Q_m$ was 2,010 and $Tf_r$ was 0.18%.

In the case of making a similar ceramic except that CuO was omitted T was 1,290° C., IR was 8.9 ($\times 10^4$ megohms), $K_p$ was 15.3%, $Q_m$ was 2,050 and $Tf_r$ was 0.38%.

This shows that this invention enables considerable reduction of the firing temperature T and the temperature variation ratio of the resonant frequency $Tf_r$.

EXAMPLE 7

A system composed of a basic composition $$Pb_{0.95}Mg_{0.05}(Ti_{0.75}Zr_{0.05}Sn_{0.20})O_3$$

and $CeO_2$ added in an amount of 1.0% by weight relative to the basic composition and with CuO in an amount of 0.5 weight percent with respect to the total amount of the basic composition and $CeO_2$; T was 1,220° C., IR was 4.5 ($\times 10^4$ megohms), $K_p$ was 11.0%, $Q_m$ was 2,050 and $Tf_r$ was 0.21%.

In the case of making a similar ceramic without CuO; T was 1,280° C., IR was 6.0 ($\times 10^4$ megohms), $K_p$ was 12.5%, $Q_m$ was 2,000 and $Tf_r$ was 0.35%.

This also indicates that the present invention provides for appreciably reduced firing temperature T and the temperature variation ratio $Tf_r$.

It will be seen that when the ceramic consisting of a basic composition $$Pb_{0.95}Mg_{0.05}(Ti_{0.45\ to\ 0.75}Zr_{0.05\ to\ 0.35}Sn_{0.1\ to\ 0.2})O_3$$

and $CeO_2$ in an amount of 0.5 to 1.0% by weight relative to the basic composition and CuO in amounts of 0.1 to 1.0% by weight, (equivalent to Cu in amounts of 0.08 to 0.80% by weight) with respect to the total amount of the composition and $CeO_2$, the firing temperature T and the temperature variation ratio of the resonant frequency $Tf_r$ can be substantially reduced.

The fact that this invention greatly improves the temperature variation ratio of the resonant frequency as compared with those of conventional ceramics is illustrated in FIG. 2, curve I which shows a temperature variation characteristic in which the ordinate represents the temperature variation ratio of the resonant frequency $Tf_r$ (in percent) and the abscissa temperature (in ° C.). This is the temperature variation characteristic obtained when the system of the Example 1 which consists of the basic composition $$Pb_{0.95}Mg_{0.05}(Ti_{0.45}Zr_{0.35}Sn_{0.20})O_3$$

and $CeO_2$ added thereto in an amount of 1.0% by weight relative to the basic composition and with CuO added in an amount of 0.3% by weight (equivalent to 0.24% by weight of Cu) with respect to the total amount of the basic composition and $CeO_2$. On the other hand, in the case of a similar ceramic except CuO was not included, the resulting temperature variation characteristic is as shown by a curve II in FIG. 1. When CuO is not included and $CeO_2$ is substituted with $PbCr_2O_4$ in an amount of 1.0 percent by weight relative to the basic composition, the resulting temperature variation characteristic was as indicated by a curve III in FIG. 1. It will be understood from the graph that this invention sufficiently improves the temperature variation ratio $Tf_r$ within the range in which a relatively high radial electromechanical coupling coefficient $K_p$ can be obtained.

Where the system of the Example 4 which was composed of the basic composition $$Pb_{0.95}Mg_{0.05}(Ti_{0.60}Zr_{0.20}Sn_{0.20})O_3$$

and $CeO_2$ added thereto in an amount of 1.0% by weight relative to the basic composition and CuO in an amount of 0.5% by weight (equivalent to Cu in an amount of 0.4% by weight) with respect to the total amount of the basic composition and $CeO_2$, the resulting temperature variation characteristic was as indicated by a curve I in FIG. 2. In the case of similar ceramic using no CuO, the temperature variation characteristic was as indicated by a curve II in FIG. 2 and when CuO and $CeO_2$ were not included the resulting temperature characteristic was as represented by a curve III in FIG. 2. From the above it will be understood that the present invention substantially improves the temperature variation ratio of the resonant frequency $Tf_r$ within the range in which a relatively low radial electromechanical coupling coefficient $K_p$ can be obtained.

In the foregoing the temperature variation ratio of the resonant frequency has been described in connection with the case of a radial vibration mode but it has been found that the present invention reduces the temperature variation ratio of the resonant frequency significant in the case of thickness vibration mode. When the ceramic consists of the basic composition $Pb_{0.95}Mg_{0.05}(Ti_{0.45}Zr_{0.35}Sn_{0.20})O_3$ and $CeO_2$ added in an amount of 1.0% by weight relative to the basic composition and with CuO in an amount of 0.08% by weight with respect to the total amount of the basic composition and $CeO_2$ the resulting temperature variation ratio was as indicated by a curve I in FIG. 3. In the case of a similar ceramic which had no CuO, the temperature variation ratio of the resonant frequency $Tf_r$ was as shown by a curve II in FIG. 3. It is seen that the temperature variation ratio of the resonant frequency can be improved by this invention substantially. With conventional ceramics, the temperature variation ratio of the resonant frequency $Tf_r$ is changed but it does not exhibit a primary change within a predetermined temperature variation range and such a change is undesirable. However in the present invention this problem does not arise.

In our opinion, when the fractions $m$ and $n$ of the basic composition $Pb_mMg_n(Ti_xZr_ySn_z)O_3$ are respectively in the range of 0.8 to 0.99 and in the range of 0.01 to 0.20 and the other fractions $x$, $y$ and $z$ are respectively in the ranges of 0.42 to 0.8, 0 to 0.4 and 0.05 to 0.42, the firing temperature T and the temperature variation ratio $Tf_r$ of the resonant frequency can be substantially reduced as by adding $CeO_2$ in an amount of 0.1 to 1.5% by weight relative to the basic composition and CuO to the system in an amount equivalent to 0.04 to 0.80% by weight of Cu with respect to the total amount of the basic composition and $CeO_2$.

In the case of a similar ceramic consisting of the basic composition $Pb_{0.95}Mg_{0.05}(Ti_{0.42}Zr_{0.38}Sn_{0.20})O_3$ and with $CeO_2$ in an amount of 1.0% by weight relative to the total amount of the basic composition; T was 1,335° C., IR was 10.0 ($\times 10^4$ megohms), $K_p$ was 15.7%, $Q_m$ was 2,100, $Tf_r$ was 1.76% and the firing temperature T and the temperature variation ratio of the resonant freqency $Tf_r$ could not be reduced as in the present invention.

Further, even if the fractions $m$, $n$, $x$, $y$ and $z$ were respectively 0.8 to 0.9, 0.01 to 0.20, 0.42 to 0.8, 0 to 0.4 and 0.05 to 0.42, when $CeO_2$ is not in an amount of 0.1 to 1.5 percent by weight and Cu is not included in an amount of 0.04 to 0.8 percent by weight of Cu, the above-described effect of reducing the temperature variation ratio $Tf_r$ of the resonant frequency and the firing temperature T was not significant.

It will be apparent that many modifications and variations may be effected without departing from the scope of the novel concepts of this invention.

We claim as our invention:

1. A piezoelectric ceramic consisting essentially of a basic composition expressed by the general formula $$Pb_mMg_n(Ti_xZr_ySn_z)O_3$$

where the fractions $m$ and $n$ are respectively 0.80 to 0.99 and 0.01 to 0.20 in atom ratio ($m+n=1$), and the fractions $x$, $y$ and $z$ are respectively 0.42 to 0.80, 0 to 0.40 and 0.05 to 0.42 in molar ratio ($x+y+z=1$), $CeO_2$ in an amount of 0.1 to 1.5 percent by weight relative to said basic composition, and CuO in an amount equivalent to 0.04 to 0.80 percent by weight of Cu with respect to the total amount of said basic composition and $CeO_2$.

2. A piezoelectric ceramic according to claim 1 wherein the fractions $m$ and $n$ are respectively, 0.95 and 0.05.

3. A piezoelectric ceramic consisting essentially of a basic composition expressed by the general formula $$Pb_mMg_n(Ti_xZr_ySn_z)O_3$$

where the fractions $m$ and $n$ are respectively 0.95 and 0.05 in atom ratio and the fractions $x$, $y$ and $z$ are respectively 0.45 to 0.75, 0.05 to 0.35 and 0.10 to 0.20 in molar ratio ($x+y+z=1$), $CeO_2$ in an amount 0.1 to 1.5 percent by weight relative to said basic composition, and CuO in an amount equivalent to 0.04 to 0.80 percent by weight of Cu with respect to the total amount of said basic composition and $CeO_2$.

References Cited

UNITED STATES PATENTS 2,892,955 6/1959 Gutton ---------- 252—62.9 X
3,179,594 4/1965 Kulcsar et al. ------- 252—62.9

TOBIAS E. LEVOW, Primary Examiner

J. COOPER, Assistant Examiner

U.S. Cl. X.R.

106—39